US012619418B2

(12) United States Patent
Kikuchi et al.

(10) Patent No.: US 12,619,418 B2
(45) Date of Patent: May 5, 2026

(54) SOFTWARE UPDATE DEVICE, SOFTWARE UPDATE SYSTEM, AND SOFTWARE UPDATE METHOD

(71) Applicant: Nissan Motor Co., Ltd., Kanagawa (JP)

(72) Inventors: Mitsuhiko Kikuchi, Kanagawa (JP); Koji Morita, Kanagawa (JP); Yoshimori Shizuka, Kanagawa (JP); Eisuke Ohashi, Kanagawa (JP); Masaaki Uzumi, Kanagawa (JP); Muneeswaran Ayyappan, Kanagawa (JP); Yohei Kaieda, Kanagawa (JP); Takayuki Inoue, Kanagawa (JP); Hidetoshi Hayashi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 284 days.

(21) Appl. No.: 18/292,251

(22) PCT Filed: Jul. 27, 2021

(86) PCT No.: PCT/JP2021/027686
§ 371 (c)(1),
(2) Date: Jan. 25, 2024

(87) PCT Pub. No.: WO2023/007577
PCT Pub. Date: Feb. 2, 2023

(65) Prior Publication Data
US 2024/0362007 A1     Oct. 31, 2024

(51) Int. Cl.
*G06F 8/65* (2018.01)

(52) U.S. Cl.
CPC ...................................... *G06F 8/65* (2013.01)

(58) Field of Classification Search
None
See application file for complete search history.

(56) References Cited

U.S. PATENT DOCUMENTS

2007/0261056 A1     11/2007   Iizuka
2008/0258758 A1*   10/2008   Kaizu ................. G06F 11/1068
                                                                            714/724
(Continued)

FOREIGN PATENT DOCUMENTS

JP          2007-219866  A      8/2007
JP          2009-110529  A      5/2009
(Continued)

*Primary Examiner* — Philip Wang
(74) *Attorney, Agent, or Firm* — Osha Bergman Watanabe & Burton LLP

(57) ABSTRACT

A software update device updates software for an in-vehicle control device mounted in a vehicle. An information acquisition unit acquires, from a server provided outside the vehicle, update process information. The output unit outputs consent request information. The execution unit executes the update process. The calculation unit calculates an estimated time required for the update. The communication status acquisition unit acquires communication status information related to communication status with the server. The correction unit corrects the estimated time based on the communication status information. The notification unit outputs information on the corrected estimated time. The notification unit, when the corrected estimated time is shorter than the estimated time before correction, does not output information on the corrected estimated time.

14 Claims, 7 Drawing Sheets

(56) References Cited

U.S. PATENT DOCUMENTS

| | | | | |
|---|---|---|---|---|
| 2011/0307882 A1* | 12/2011 | Shiba | G06F 8/65 |
| | | | 717/173 |
| 2015/0339114 A1* | 11/2015 | Rockwell | G06F 8/65 |
| | | | 701/1 |
| 2017/0123782 A1* | 5/2017 | Choi | G06F 8/65 |
| 2017/0139698 A1* | 5/2017 | Muroyama | G06F 8/656 |
| 2017/0315797 A1* | 11/2017 | Vangelov | H04L 67/12 |
| 2018/0218491 A1 | 8/2018 | Tamai | |
| 2020/0050378 A1 | 2/2020 | Sakurai et al. | |
| 2020/0050442 A1 | 2/2020 | Sakurai et al. | |
| 2020/0183676 A1 | 6/2020 | Sakurai et al. | |
| 2020/0241771 A1 | 7/2020 | Sakurai et al. | |
| 2021/0155176 A1 | 5/2021 | Harata et al. | |
| 2021/0157529 A1 | 5/2021 | Sakurai et al. | |
| 2021/0157566 A1 | 5/2021 | Sakurai et al. | |
| 2021/0157567 A1 | 5/2021 | Sakurai et al. | |
| 2021/0157568 A1 | 5/2021 | Sakurai et al. | |
| 2021/0157571 A1 | 5/2021 | Ogawa et al. | |
| 2021/0157572 A1 | 5/2021 | Harata et al. | |
| 2021/0157575 A1 | 5/2021 | Ogawa et al. | |
| 2021/0157902 A1* | 5/2021 | Sakurai | G06F 9/445 |
| 2021/0173635 A1* | 6/2021 | Shin | G01R 31/3647 |
| 2022/0012043 A1* | 1/2022 | Sakurai | H04L 9/3239 |
| 2022/0027166 A1* | 1/2022 | Kamitsuji | G06F 9/4843 |
| 2022/0204008 A1* | 6/2022 | Kogure | B60W 50/045 |
| 2025/0300935 A1* | 9/2025 | Song | H04L 69/329 |

FOREIGN PATENT DOCUMENTS

| | | | |
|---|---|---|---|
| JP | 2016-038634 A | | 3/2016 |
| JP | 2016-133313 A | | 7/2016 |
| JP | 2018-124605 A | | 8/2018 |
| JP | 2020-027669 A | | 2/2020 |
| JP | 6692729 B2 * | | 5/2020 |
| WO | 2021/117445 A1 | | 6/2021 |

* cited by examiner

FIG. 3

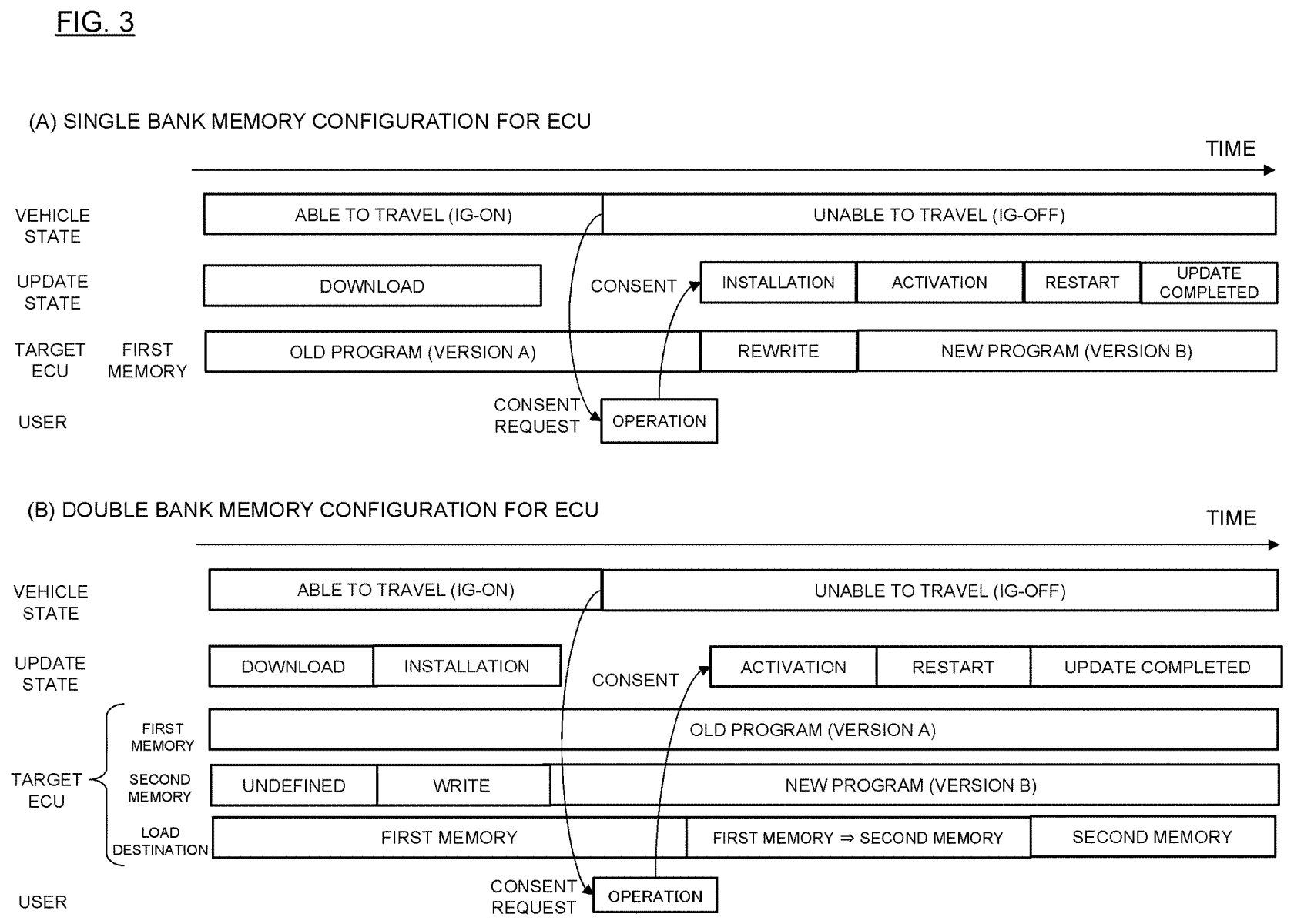

(A) SINGLE BANK MEMORY CONFIGURATION FOR ECU

| | | | | | |
|---|---|---|---|---|---|
| VEHICLE STATE | ABLE TO TRAVEL (IG-ON) | UNABLE TO TRAVEL (IG-OFF) | | | |
| UPDATE STATE | DOWNLOAD | | INSTALLATION | ACTIVATION | RESTART | UPDATE COMPLETED |
| TARGET ECU    FIRST MEMORY | OLD PROGRAM (VERSION A) | REWRITE | NEW PROGRAM (VERSION B) | | |
| USER | CONSENT REQUEST    OPERATION | CONSENT | | | |

TIME →

(B) DOUBLE BANK MEMORY CONFIGURATION FOR ECU

| | | | | | |
|---|---|---|---|---|---|
| VEHICLE STATE | ABLE TO TRAVEL (IG-ON) | UNABLE TO TRAVEL (IG-OFF) | | | |
| UPDATE STATE | DOWNLOAD | INSTALLATION | ACTIVATION | RESTART | UPDATE COMPLETED |
| TARGET ECU  FIRST MEMORY | UNDEFINED | WRITE | OLD PROGRAM (VERSION A) | | |
| SECOND MEMORY | | NEW PROGRAM (VERSION B) | | |
| LOAD DESTINATION | FIRST MEMORY | FIRST MEMORY ⇒ SECOND MEMORY | SECOND MEMORY | |
| USER | CONSENT REQUEST    OPERATION | CONSENT | | | |

TIME →

SOFTWARE UPDATE DEVICE, SOFTWARE UPDATE SYSTEM, AND SOFTWARE UPDATE METHOD

TECHNICAL FIELD

The present invention relates to a software update device, a software update system, and a software update method.

BACKGROUND ART

A conventional information processing terminal is known that can automatically update software at a timing according to a user's preference (Patent Document 1). This information processing terminal can also be used as an in-vehicle terminal mounted on a vehicle.

PRIOR ART DOCUMENT

Patent Document

Patent Document 1: Japanese Patent Application Publication No. 2016-38634

SUMMARY OF INVENTION

Problems to be Solved by Invention

Since the vehicle cannot be started while the process for an update of software is being executed, the user cannot use the vehicle. In the above-mentioned information processing terminal, there is a problem in that when an error occurs that prevents the update of software from being completed, an in-vehicle control device cannot determine which software is to be executed, not allowing the user to use the vehicle.

The problem to be solved by the present invention is to provide a software update device, a software update system, and a software update method that allow a user to use a vehicle even when an error occurs that prevents an update of software from being completed.

Means for Solving Problems

The present invention solves the above problem by acquiring, from a server provided outside a vehicle, update process information related to an update of software of an in-vehicle control device; outputting consent request information for asking a user whether to consent to the update of software; outputting an estimated time required to update the software; and executing an update process according to response information that is a response to the consent request information from the user.

Effects of Invention

According to the present invention, since the software update process can be executed based on the estimated time required to update the software and the user's response information, the user can use the vehicle.

BRIEF DESCRIPTION OF DRAWINGS

FIG. 3 is an explanatory diagram for explaining an update of software by OTA depending on the memory configuration of an ECU.

MODE(S) FOR CARRYING OUT THE INVENTION

Hereinafter, embodiments of a software update device, a software update system, and a software update method according to the present invention will be described with reference to the drawings.

First Embodiment

Figure 1:
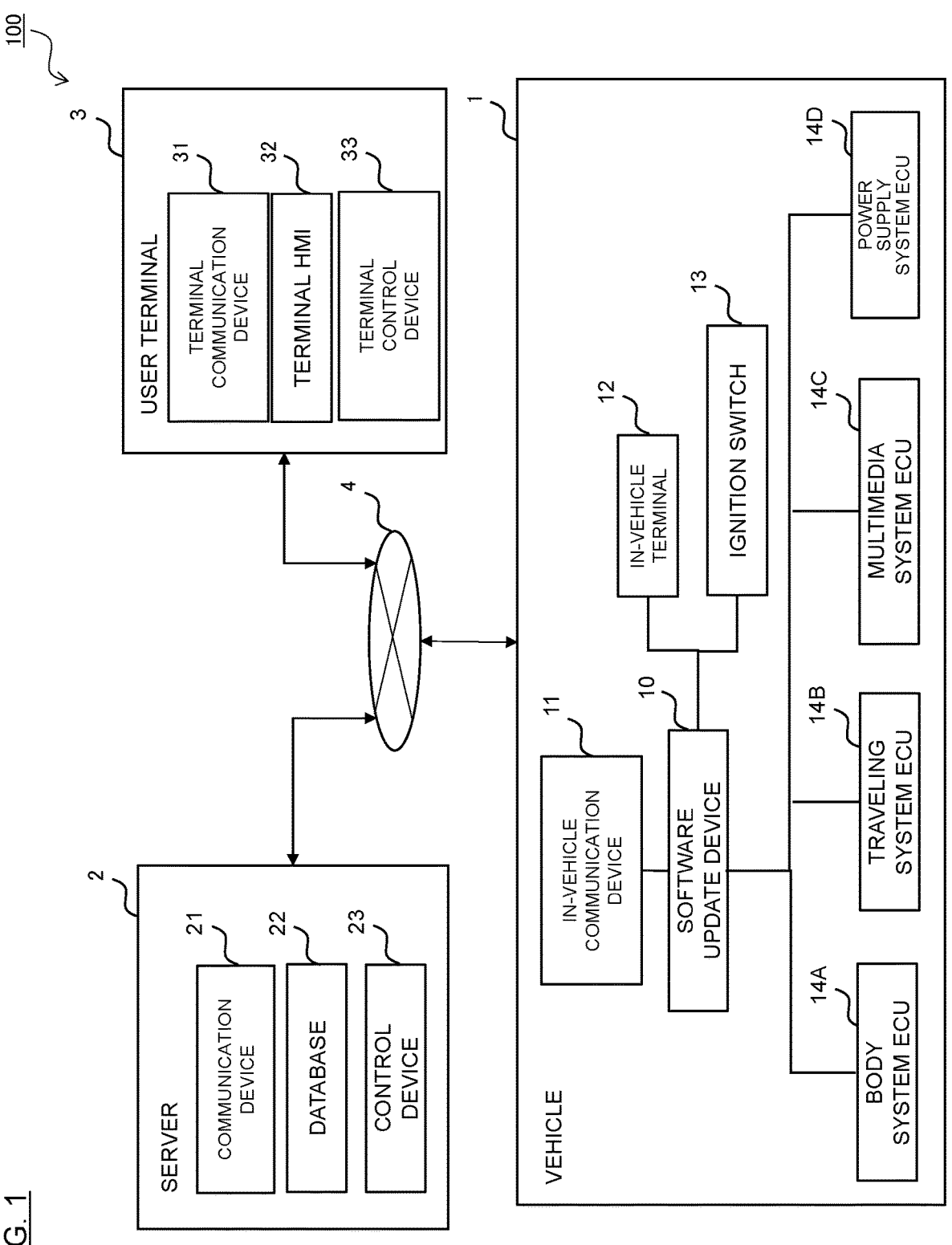
FIG. 1 is a block diagram illustrating an example of a software update system including a software update device according to a first embodiment.

A software update device 10 according to the present embodiment is provided as a part of a software update system 100, as illustrated in FIG. 1. FIG. 1 is a block diagram illustrating an example of the software update system 100 according to the present embodiment. The software update system 100 is a system that can update software for vehicle control, diagnosis, and the like, which are executed by an electronic control unit (hereinafter referred to as ECU) of a vehicle 1 by Over-The-Air (OTA). Such an update of software by OTA is also referred to as Firmware Over-The-Air (FOTA). The software for the ECU is implemented by a microcomputer included in the ECU executing a program. In the present embodiment, a case will be described by way of example in which the program to be executed by the microcomputer of the ECU is wirelessly rewritten by a wireless update of software for the ECU. However, the software update system 100 can also be applied to a case of wirelessly rewriting data used in various software, such as map data used in a navigation system of the vehicle 1 and control parameters used in the ECU, for example. Further, for an ECU using a field programmable gate array (FPGA), the software update system 100 can also be applied to a case of wirelessly rewriting the functions (logics) of the FPGA. Further, although one vehicle is illustrated as the vehicle 1 in FIG. 1, the software update system 100 is a system that can update software for a plurality of vehicles 1.

Further, in the present embodiment, "an update of software for the ECU" means that the version of the software for the ECU is changed to a new version, that is, a program to be executed by the microcomputer is changed to a new version. Further, a wireless update of software includes, in addition to wirelessly acquiring a new version of the program itself from outside the vehicle 1 and rewriting it, wirelessly acquiring various data used to execute the new version of the program, and differential data between the new version of the program and the old version of the program from outside the vehicle 1 and rewriting it. In the following description, data necessary for updating software, such as a new version of a program or differential data, will be referred to as "update data". Further, a "new version of a program" is referred to as a "new program", an "old version of the program" is referred to as an "old program", and "differential data between a new version of a program and an old version of the program" is referred to as "differential data". Further, in the present embodiment, "completion of process" means that the process has been successfully completed, and does not include that the process has ended abnormally. Further, in the present embodiment, a user who is outside the vehicle 1 will be described as an example of a user who performs procedures related to an update of software.

As illustrated in FIG. 1, the software update system 100 includes the vehicle 1, a server 2, and a user terminal 3. The components included in the software update system 100 are configured to exchange information via a wireless communication network 4. The wireless communication network 4 includes, for example, a mobile communication network such as a 4G network, the Internet, Wi-Fi (Wireless Fidelity) (registered trademark), and the like. First, the roles of the vehicle 1, the server 2, and the user terminal 3 in the software update system 100 will be described.

In the vehicle 1, ECUs for which software can be updated are mounted. The vehicle 1 exchanges various information related to an update of software with the server 2. Information related to each ECU mounted in the vehicle 1 is transmitted from the vehicle 1 to the server 2. Information related to the ECU includes, for example, the current version of software. Information related to each ECU mounted in the vehicle 1 is transmitted from the vehicle 1 to the server 2 based on a predetermined transmission condition (e.g., in a predetermined cycle).

Further, information related to an update of software is transmitted from the server 2 to the vehicle 1. Examples of the information related to the update of software include campaign information, update data, an estimate of the time required for an update process, the importance of the update, and the like. The campaign is an event in which the server 2 distributes a distribution package to one or more vehicles 1. The distribution package includes update data, authentication data used for an authentication process for the update data, and the like. The campaign information is information for presenting the overview of the update of software to the user. Specific examples of the campaign information and the estimate of the time required for the update process will be described later. The estimate of the time required for the update process may be included in the distribution package. If the user consents to the start of an update process for software, the update process for software is executed in the vehicle 1 by the software update device 10, which will be described later. When the update process is started in the vehicle 1, information indicating the progress of the update process is transmitted from the vehicle 1 to the server 2.

The server 2 is a server that controls the software update process in the software update system 100 and functions as an OTA center. The server 2 exchanges various information related to the update of software described above with the vehicle 1. Further, the server 2 also exchanges various information with the user terminal 3.

The server 2 has a storage function for storing update data, a data management function for managing the versions of each piece of software, the vehicle identification number (VIN) of the vehicle 1 to be updated, the ECU to be updated, and the like, a campaign management function for managing information related to campaign such as a distribution timing for campaign information, a distribution function for distributing campaign information and update data, and the like. For example, when receiving various information including update data from a provider for the update data, the server 2 stores the update data in a storage device. The server 2 identifies based on the information received from the provider the VIN for which the update data is to be distributed and the ECU to be updated (hereinafter referred to as update target ECU). The server 2 sets a distribution timing for campaign information, and when the distribution timing for campaign information comes, the server 2 transmits the campaign information to the vehicle 1 and/or the user terminal 3. If the user consents to a distribution package being transmitted to the vehicle 1, the server 2 transmits the distribution package to the vehicle 1. When the update process is started in the vehicle 1 after the transmission of the distribution package from the server 2 is completed, the server 2 receives progress information indicating the progress of the update process from the vehicle 1, and transmits the received progress information to the user terminal 3.

The user terminal 3 is a terminal that can be carried by the user and has a function of receiving an operation input from the user and a function of displaying various screens. Examples of the user terminal 3 include a smartphone, a tablet, and the like. The user terminal 3 exchanges various information such as campaign information with the server 2. When receiving campaign information from the server 2, the user terminal 3 notifies the user of the campaign information. Further, when the user performs an operation on the user terminal 3 indicating consent to the transmission of a distribution package, the user terminal 3 transmits consent information indicating the user's consent to the server 2. Further, the user terminal 3 also exchanges information related to an update process with the vehicle 1 through the server 2. When the user terminal 3 receives from the server 2 an input of information for asking the user for consent to start the update process, the user terminal 3 displays an image for asking the user for consent. Further, when the user performs an operation on the user terminal 3 indicating consent to start the update process, the user terminal 3 transmits consent information indicating the user's consent to the server 2. When the update process is started in the vehicle 1, the user terminal 3 receives progress information from the server 2, and notifies the user of the received progress information.

Next, the configurations of the vehicle 1, the server 2, and the user terminal 3 will be described with reference to FIG. 1. First, the configuration of the server 2 will be described. As illustrated in FIG. 1, the server 2 includes a communication device 21, a database 22, and a control device 23.

The communication device 21 has a communication function for performing data communication with the vehicle 1 and the user terminal 3 via the wireless communication network 4. In order for the communication device 21 to transmit and receive data to and from the vehicle 1, the vehicle 1 needs to be located within the range of the wireless communication network 4. Further, in order for the communication device 21 to transmit and receive data to and from the user terminal 3, the user terminal 3 needs to be located within the range of the wireless communication network 4.

The database 22 stores registration information of the vehicle 1, campaign information, update data, and the like. The registration information of the vehicle 1 includes at least the VIN of the vehicle 1, the number of ECUs mounted in the vehicle 1, the type of each ECU, and the software version of each ECU. The campaign information includes the data size of the update data, information for identifying the update target ECU (ECU name, ECU ID, etc.), information on the version of the software to be updated (version name, version ID, etc.), a general description of the function to be updated, an estimated time required to complete the download of a distribution package (estimated download time), an estimated time required to complete the update process in the vehicle 1 (estimated update process time), and the like.

The control device 23 is a device that functions as a control tower for the server 2, and includes, for example, a processor and a memory programmed to execute one or more functions implemented by a computer program. The control device 23 has the data management function, the campaign management function, the distribution function, and the like, which are described above. In the present embodiment, a function of calculating an estimated update process time will be described as an example of a function of the control device 23.

The control device 23 calculates an estimated update process time based on the data size of the update data. For example, if a map indicating a relationship between the data size of update data and an estimated update process time is stored in the database 22 in advance, the control device 23 refers to the map to calculate the estimated update process time corresponding to the data size. Further, for example, the control device 23 calculates the estimated update process time such that it is longer as the data size of the update data is larger. Note that the data size of the update data may be either the data size of the new program itself or the data size of the differential data.

Further, the control device 23 may calculate the estimated update process time based on the type of the update target ECU instead of or in addition to the data size of the update data. For example, the control device 23 calculates the estimated update process time based on the specifications of the microcomputer and/or flash memory included in the ECU. For example, if the operating frequency of the microcomputer included in the update target ECU is higher than a predetermined reference frequency, the control device 23 calculates the estimated update process time such that it is shorter than in a case where the operating frequency of the microcomputer is lower than the predetermined reference frequency. This is based on the viewpoint that the higher the operating frequency of the microcomputer, the shorter the time required for the update process. Further, for example, if the memory capacity of the flash memory included in the update target ECU is larger than a predetermined reference capacity, the control device 23 calculates the time required for the update process such that it is longer than in a case where the memory capacity of the flash memory is smaller than the predetermined reference capacity. This is based on the viewpoint that the larger the memory capacity of the flash memory, the larger the file size of the program and the longer the time required for the update process. Further, the method for calculating an estimated update process time is just one example, and the control device 23 may calculate an estimated update process time using other calculation methods.

The configuration of the user terminal 3 will be described. As illustrated in FIG. 1, the user terminal 3 includes a terminal communication device 31, a terminal human machine interface (HMI) 32, and a terminal control device 33.

The terminal communication device 31 has a function of performing data communication with the server 2 via the wireless communication network 4. The terminal HMI 32 functions as at least one of a device that receives an operation input from the user and a device that notifies the user of information. Examples of the terminal HMI 32 include a touch panel display and the like. Note that the terminal HMI 32 is not limited to a device that displays information, but may be a device that outputs information in audio, such as a speaker. Note that in a case where the user terminal 3 is directly connected to an in-vehicle device of the vehicle 1 via Bluetooth (registered trademark) or the like, the user terminal 3 may perform data communication with the server 2 through an in-vehicle communication device 11 of the vehicle 1. Further, in a case where an in-vehicle device and the user terminal 3 are directly connected to each other, the in-vehicle device may communicate with the server 2 from the user terminal 3 via the wireless communication network 4.

The terminal control device 33 is a device that functions as a control tower for the user terminal 3, and includes, for example, a processor and a memory programmed to execute one or more functions implemented by a computer program. In a software update process for an ECU of the vehicle 1, the terminal control device 33 executes a process for notifying the user of campaign information and progress information of the update process. Taking campaign information as an example, when receiving campaign information from the server 2 through the terminal communication device 31, the terminal control device 33 outputs the campaign information to the terminal HMI 32 and causes the terminal HMI 32 to display the campaign information. Further, the terminal control device 33 executes a consent request process for asking the user for consent in the software update process for the ECU of the vehicle 1. Taking a case of asking the user for consent to start the update process as an example, the terminal control device 33 generates a consent request image for asking the user for consent to start the update process, outputs the consent request image to the terminal HMI 32, and causes the terminal HMI 32 to display the consent request image.

When the user terminal 3 is located within the range of the wireless communication network 4, the user who is outside the vehicle 1 is allowed to perform an operation input while checking various information related to the update of software on the user terminal 3, to perform procedures related to the update of software. Note that the block configuration and functions of the user terminal 3 described above are merely examples, and do not limit the user terminal 3. Further, in the present embodiment, a case will be described by way of example in which the user uses the user terminal 3 to perform procedures related to an update process. However, the software update device, the software update system, and the software update method according to the present invention can also be applied to a case in which the user uses an in-vehicle terminal 12 to perform the procedures related to the update process.

Next, the configuration of the vehicle 1 will be described. As illustrated in FIG. 1, the vehicle 1 includes the software update device 10, the in-vehicle communication device 11, the in-vehicle terminal 12, an ignition switch 13, a body system ECU 14A, a traveling system ECU 14B, a multimedia system ECU 14C, and a power supply system ECU 14D. The components included in the vehicle 1 are connected by an in-vehicle network such as a Controller Area Network (CAN) or a Local Interconnect Network (LIN).

The in-vehicle communication device 11 has a function of performing data communication with the server 2 via the wireless communication network 4. Examples of the in-vehicle communication device 11 includes a telematics control unit (TCU).

The in-vehicle terminal 12 is a terminal that has a function of receiving an operation input from the user (occupant) riding in the vehicle 1 and a function of displaying various screens. Examples of the in-vehicle terminal 12 include a touch panel display and the like. Signals for notifying the occupant of various information are input to the in-vehicle terminal 12 from the software update device 10. For example, when information for asking the occupant for consent to start the update process is input from the software update device 10, the in-vehicle terminal 12 displays an image for asking the occupant for consent. Further, for example, when the occupant performs an operation on the in-vehicle terminal 12 indicating consent to start the update process, the in-vehicle terminal 12 outputs consent information indicating the occupant's consent to the software update device 10. When the vehicle 1 is located within the range of the wireless communication network 4, the user inside the vehicle 1 is allowed to perform an input operation while checking various information related to the update of software on the in-vehicle terminal 12, to perform procedures related to the update of software. Note that the in-vehicle terminal 12 is not limited to a device that displays information, but may be a device that outputs information in audio, such as a speaker.

The ignition switch 13 functions as a starting switch for the vehicle 1 and is a switch for turning the ignition of the vehicle 1 on or off. For example, when the occupant performs an operation to turn the ignition from on to off, the ignition switch 13 outputs a signal indicating the content of the user's operation to the software update device 10.

The body system ECU 14A, the traveling system ECU 14B, and the multimedia system ECU 14C are examples of ECUs to be updated by the software update device 10. Each ECU includes as functional blocks a microcomputer that includes a central processing unit (CPU), a read only memory (ROM), a random access memory (RAM), and a flash memory; a power supply circuit; a data transfer circuit; and the like. The flash memory stores programs for implementing software for the ECU. The software for the ECU is implemented by the microcomputer executing the program(s) stored in the flash memory to perform various processes.

The flash memory of the ECU is divided into single bank memory and double bank memory depending on the memory configuration. In the single bank memory, there is no distinction between a storage area for programs and a program execution area for the microcomputer, and a program cannot be rewritten in the single bank memory while the microcomputer is executing the program. On the other hand, the double bank memory has two areas as program storage areas, and the microcomputer executes a program in one of the two storage areas. Therefore, in the double bank memory, even while the microcomputer is executing the program, a program can be written to the other storage area that does not store the program being executed. The two program storage areas of the double bank memory will hereinafter be referred to as a first memory and a second memory for convenience.

The body system ECU 14A is a general term for ECUs that control the body system of the vehicle 1. Examples of the body system ECU 14A include a door control ECU that controls locking/unlocking of the doors of the vehicle 1, a meter control ECU that controls the meter display of the vehicle 1, an air conditioner control ECU that controls the driving of the air conditioner of the vehicle 1, a window control ECU that controls opening and closing of one window of the vehicle 1, and the like. The traveling system ECU 14B is a general term for ECUs that control the traveling system of the vehicle 1. Examples of the traveling system ECU 14B include a drive source control ECU that controls the drive source of the vehicle 1, a brake control ECU that controls the drive of the brakes of the vehicle 1, a power steering control ECU that controls the drive of the power steering of the vehicle 1, and the like. The multimedia system ECU 14C is a general term for ECUs that control the multimedia system of the vehicle 1. Examples of the multimedia system ECU 14C include a navigation control ECU that controls the navigation system of the vehicle 1, an audio control ECU that controls the audio devices of the vehicle 1, and the like.

Control signals for an update process are input from the software update device 10 to the body system ECU 14A, the traveling system ECU 14B, and the multimedia system ECU 14C, so that each ECU executes the update process for software. Although each ECU is illustrated as one in FIG. 1, the number of update target ECUs is not particularly limited, and the software update system 100 can update software for a plurality of update target ECUs. Further, the body system ECU 14A, the traveling system ECU 14B, and the multimedia system ECU 14C, which are illustrated in FIG. 1, are examples of ECUs to be mounted in the vehicle 1, but do not limit to the types of ECUs to be mounted in the vehicle 1 and the way of distinguishing between ECUs. Further, the vehicle 1 may be equipped with an ECU(s) other than the ECUs illustrated in FIG. 1.

The power supply system ECU 14D is a general term for ECUs that control the power supply system of the vehicle 1. Examples of the power supply system ECU 14D include a power supply control ECU that controls an ACC (accessory) power source and an IG (ignition) power source, which are mounted in the vehicle 1. A control signal for an update process is input from the software update device 10 to the power supply system ECU 14D. For example, the power supply system ECU 14D executes a process of turning off the ignition of the vehicle 1.

Figure 2:
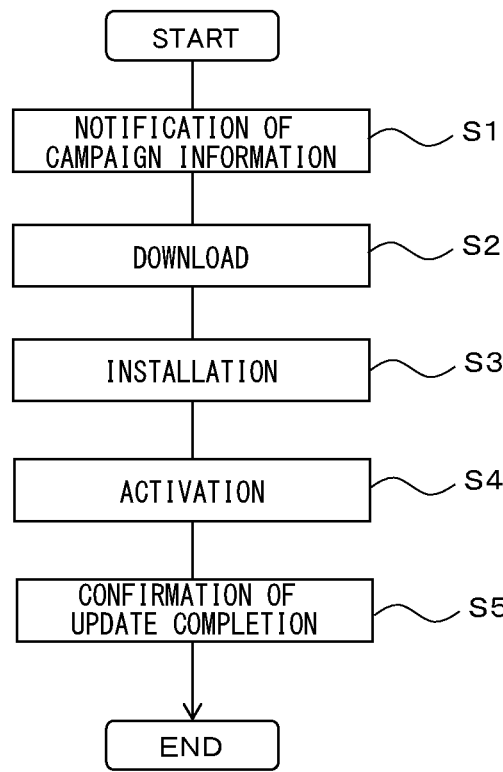
FIG. 2 is an explanatory diagram for explaining a flow of an update of software by OTA.

Here, the outline of a software update flow by OTA and the relationship between the memory configurations for an ECU will be described with reference to FIGS. 2 and 3. FIG. 2 is an explanatory diagram for explaining a flow of an update of software by OTA. As illustrated in FIG. 2, an update of software by OTA is performed through multiple stages. Specifically, in an update of software by OTA, notification of campaign information (step S1), download (step S2), installation (step S3), activation (step S4), and confirmation of update completion (step S5) are sequentially performed.

In step S1, campaign information is transmitted from the server 2 to the vehicle 1 and/or the user terminal 3, and the user is notified of the campaign information through the in-vehicle terminal 12 and/or the user terminal 3. In step S2, a distribution package including update data is transmitted from the server 2 to the vehicle 1, and the distribution package is stored in the vehicle 1. In step S3, a process of writing a new program is performed for the update target ECU. In step S4, a process of loading the new program is performed by the microcomputer to enable the new program. In step S5, the user is notified of the completion of the update of software through the in-vehicle terminal 12 and/or the user terminal 3.

FIG. 3 is an explanatory diagram for explaining an update of software by OTA depending on the memory configuration of an ECU. In FIG. 3, each step of download, installation, activation, and confirmation of update completion among the plurality of steps illustrated in FIG. 2 is represented as "update state". Further, in FIG. 3, the state of the vehicle 1 in each update state is represented as "vehicle state", the operation of the update target ECU as "target ECU", and the state of the user as "user". (A) of FIG. 3 is an example of the software update flow for a single bank memory configuration for an ECU, and (B) of FIG. 3 is an example of the software update flow for a double bank memory configuration for an ECU.

As illustrated in (A) of FIG. 3, for the single bank memory configuration for the update target ECU, "download" of a distribution package is performed in the vehicle 1 with the vehicle 1 being ready to travel (the ignition switch 13 being on). After the download is completed, when the ignition switch 13 is switched from on to off with the vehicle 1 being stopped, a "consent request" is made to ask the user for consent to start an update process. In the present embodiment, the user outside the vehicle 1 performs an operation input while checking various information related to the update of software on the user terminal 3, to perform procedures related to the update of software.

After the download from the server 2 is completed, when the occupant (driver) of the vehicle 1 turns the ignition switch from on to off, for example, the user terminal 3 displays information for asking for consent to start the update process (e.g., displaying "Do you want to update the software?") and two user-operable icons: an icon indicating consent (e.g., displaying "Right Now") and an icon indicating refusal (e.g., displaying "Later"). When the user consents to start the update process and presses the "Right Now" icon, "installation" using the update data is performed in the vehicle 1. Specifically, in the flash memory of the ECU, a rewrite process is performed to write a new program after deleting the old program. When the rewrite process is complete, "activation" is performed to cause the microcomputer of the ECU to load the new program. After that, the update of software is completed through a power restart process (reboot process) for the vehicle 1. When the update of software is completed, an update completion notification indicating that the update has been completed is displayed on the user terminal 3 (e.g., displaying "Software update completed"). Further, after the update process is completed, the power supply system ECU 14D executes a process of turning off the ignition of the vehicle 1. On the other hand, if the user presses the "Later" icon without consenting to start the update process, the software update process for the ECU will not start in the vehicle 1, and the process of turning off the ignition of the vehicle 1 will be executed by the power supply system ECU 14D. Further, an update process postponement notification indicating that the update process is postponed is displayed on the user terminal 3 (e.g., displaying "Postponed to next time").

Further, as illustrated in (B) of FIG. 3, for the double bank memory configuration for the ECU, not only "download" for a distribution package but also "installation" using the update data are performed in the vehicle 1 with the vehicle 1 being ready to travel. When the microcomputer of the ECU is executing a program (old program) stored in the first memory, a write process for writing a new program to the second memory is performed. After the installation is completed, when the occupant (driver) of the vehicle 1 turns the ignition switch 13 from on to off, a "consent request" is made to request the user's consent to start an update process. Similarly to the example in (A) of FIG. 3, the user terminal 3 displays, for example, information for asking for consent to start the update process, an icon indicating consent, and an icon indicating refusal. When the user consents to start the update process, "activation" is performed to change the load memory for the microcomputer from the first memory to the second memory. After that, the update of software is completed through a power restart process for the vehicle 1.

In this way, although there is a differences in the specific content of the software update process between "installation" as well as "activation" and "activation" depending on the flash memory configuration of the ECU, the vehicle 1 executes the update process regardless of either update process when the occupant is requested to consent to start the update process and then the occupant performs an operation to consent to start the update process. Further, when the update process is completed, the user can know that the update process has been completed through the update completion notification displayed on the user terminal 3. For example, in a case where there are a first user at home and a second user using the vehicle 1, assume that the second user has parked the vehicle 1 in a home parking lot to switch the ignition switch from on to off, and the first user has performed an update procedure for software through the user terminal 3. After that, when the first user tries to go out by the vehicle 1, the first user who has confirmed the update completion notification is allowed to use the vehicle 1 in which the software update process has been completed. However, when a loop process or the like occurs during the update process due to some abnormality and thus, the update process is not completed (including cases where the update process end abnormally), there is a problem that an update completion notification is not displayed on the user terminal 3, so that the first user may not be allowed to use the vehicle 1. Therefore, the software update device 10 according to the present embodiment aims to solve the above problem with the following configuration and method.

Figure 4:
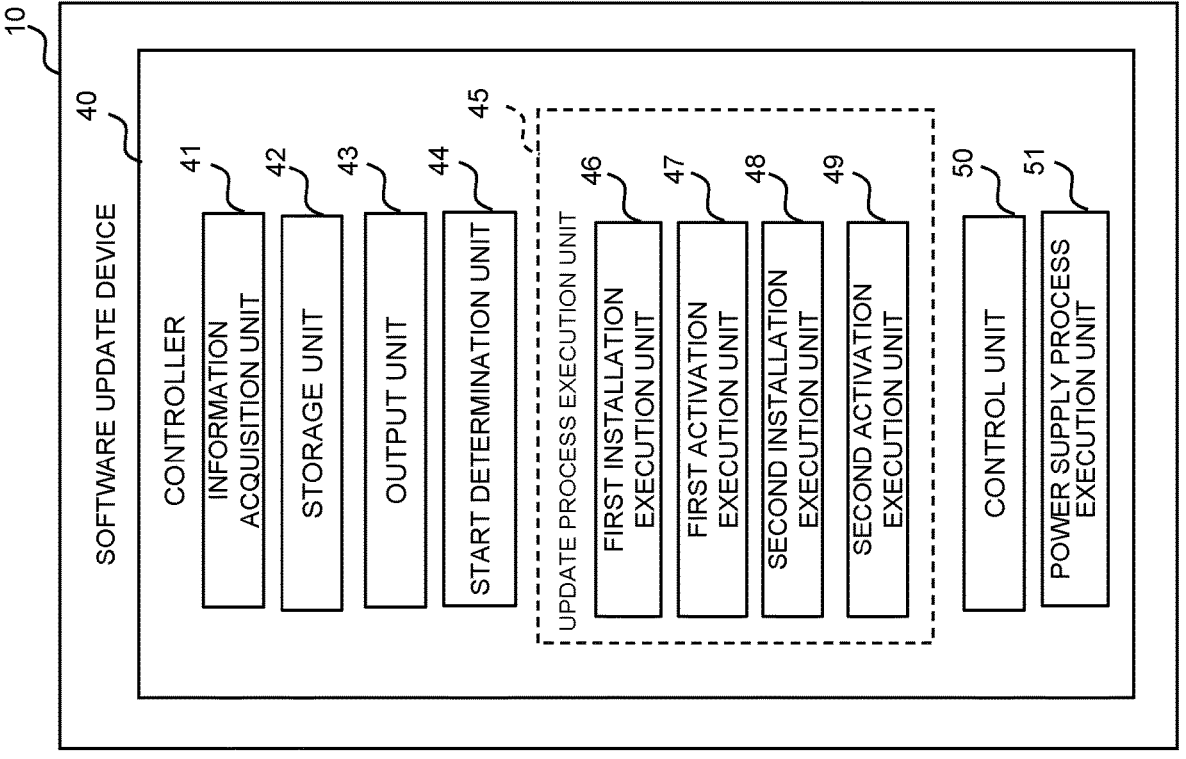
FIG. 4 is an example of functional blocks included in a controller of the software update device illustrated in FIG. 1.

Next, the software update device 10 will be described. As illustrated in FIG. 4, the software update device 10 includes a controller 40. FIG. 4 is an example of functional blocks included in the controller 40 of the software update device 10. The controller 40 is configured by a computer including hardware and software, and includes a memory that stores programs, a CPU that executes a program stored in this memory, and others. Note that the operable circuits to be used can include, instead of or together with the CPU, an MPU, a DSP, an ASIC, an FPGA, and the like.

As illustrated in FIG. 4, the controller 40 includes as functional blocks an information acquisition unit 41, a storage unit 42, an output unit 43, a start determination unit 44, an update process execution unit 45, a control unit 50, and a power supply process execution unit 51. The controller 40 implements each function of the functional blocks using software stored in the memory.

The information acquisition unit 41 acquires update process information related to an update of software from the server 2 through the in-vehicle communication device 11. The update process information includes the above-described campaign information and distribution package. Further, the information acquisition unit 41 also acquires a signal indicating the on state or off state of the ignition switch 13 from the ignition switch 13. Further, the information acquisition unit 41 acquires a signal indicating a user's operation from the in-vehicle terminal 12. Further, the information acquisition unit 41 acquires a signal indicating a user's operation on the user terminal 3 through the server 2. For example, when the user presses a consent indication displayed on the user terminal 3, the information acquisition unit 41 acquires, from the user terminal 3 through the server 2, a signal indicating that the consent indication has been pressed by the user. Further, for example, when the user presses a refusal indication displayed on the user terminal 3, the information acquisition unit 41 acquires, from the user terminal 3 through the server 2, a signal indicating that the refusal indication has been pressed by the user.

The storage unit 42 functions as a storage device that stores information acquired from the server 2 among the information acquired by the information acquisition unit 41. As the storage unit 42, for example, a nonvolatile recording medium such as a flash memory is used. The storage unit 42 stores the campaign information and distribution package acquired from the server 2. Further, the storage unit 42 may store information related to the ECU mounted on the vehicle 1 (memory configuration for the ECU, etc.). Various information stored in the storage unit 42 is used for processing by the update process execution unit 45.

The output unit 43 outputs consent request information for asking the user whether to consent to start the update process by the update process execution unit 45. Examples of the consent request information include images, audio, and the like, but the method of asking the user for consent is not particularly limited. For example, an indication image of "Do you want to update the software?" as described above is read from the memory, and the corresponding image signal is transmitted to the server 2 through the in-vehicle communication device 11. Further, for example, the output unit 43 may transmit an audio signal for asking the user whether to consent to start the update process to the server 2 through the in-vehicle communication device 11 together with or in place of the image signal. The consent request information transmitted from the in-vehicle communication device 11 is received by the server 2, and then transmitted from the server 2 to the user terminal 3.

Further, in the present embodiment, the output unit 43 outputs the consent request information when a predetermined output condition is satisfied. The output unit 43 determines whether or not the ignition switch 13 has been turned from on to off by the occupant, based on the information acquired by the information acquisition unit 41. The output unit 43 outputs the consent request information when a signal indicating the state of the ignition switch 13 switches from the on state to the off state. Note that the output condition for the output unit 43 is merely an example, and the output condition may be other conditions.

The start determination unit 44 determines whether or not the update process execution unit 45 should start the update process. If the user consents to start the update process in response to the consent request information output by the output unit 43, the start determination unit 44 determines that the update process is to start; if the user refuses to start the update process in response to the consent request information, the start determination unit 44 determines that the update process is not to start. For example, when the user performs an operation on the user terminal 3 indicating consent to start the update process, the information acquisition unit 41 acquires consent information from the server 2, and the start determination unit 44 determines that the update process is to start, as described above. On the other hand, for example, when the user performs an operation on the user terminal 3 indicating refusal to start the update process, the information acquisition unit 41 acquires refusal information from the server 2, and the start determination unit 44 determines that the update process is not to start, as described above.

The update process execution unit 45 executes the update process depending on response information that is a user's response to the consent request information. When the start determination unit 44 determines that the update process is to start, the update process execution unit 45 executes the update process; when the start determination unit 44 determines that the update process is not to start, the update process execution unit 45 postpones the execution of the update process. When the update process in the update target ECU is successfully completed, the update process execution unit 45 receives an update process completion notification from the update target ECU, and the update process execution unit 45 outputs the input notification to the control unit 50. Note that when the start determination unit 44 determines that the update process is not to start, the execution of the update process may be postponed, and the update process execution unit 45 may execute other processes.

The update process execution unit 45 includes, as functional blocks that execute an update process, installation execution units and activation execution units, depending on the memory configuration of the update target ECU. As illustrated in FIG. 4, the update process execution unit 45 includes a first installation execution unit 46 and a first activation execution unit 47, which correspond to a single bank memory configuration, and a second installation execution unit 48 and a second activation execution unit 49, which correspond to a double bank memory configuration. As described with reference to FIG. 3, the processing contents of "installation" and "activation" differ depending on whether the ECU has the single bank or double bank memory configuration. Therefore, in the present embodiment, a plurality of installation execution units and a plurality of activation execution units are provided. For the single bank memory configuration for the update target ECU, the first installation execution unit 46 installs a new program, and the first activation execution unit 47 activates the new program. On the other hand, for the double bank memory configuration for the update target ECU, the second installation execution unit 48 installs a new program, and the second activation execution unit 49 activates the new program. The update process execution unit 45 determines the memory configuration of the update target ECU from the information related to the ECU mounted on the vehicle 1 stored in the storage unit 42.

The first installation execution unit 46 executes an installation process for writing a new program after deleting the old program stored in the flash memory. The first activation execution unit 47 executes an activation process for causing the microcomputer included in the update target ECU to load the new program written in the flash memory.

If the old program is stored in the first memory of the first memory and second memory in the flash memory and the microcomputer loads the old program, the second installation execution unit 48 executes an installation process for writing the new program to the second memory where the old program is not stored. The second activation execution unit 49 executes an activation process for changing the program load destination for the microcomputer included in the update target ECU from the first memory to the second memory.

The control unit 50 determines a target program to be executed by the update target ECU based on an estimated time required for the update process. In the present embodiment, the estimated time required for the update process is the estimated update process time calculated by the server 2. As described with reference to FIG. 3, the specific content of the update process is for "installation" as well as "activation" or "activation" depending on the memory configuration of the update target ECU. Therefore, the details of the estimated update process time calculated by the server 2 vary depending on the specifications of the update target ECU. Specifically, for the single bank memory configuration for the update target ECU, the estimated update process time is composed of a time required for the installation process and a time required for the activation process. For the double bank memory configuration for the update target ECU, the estimated update process time is composed of a time required for activation.

When the update process is not completed within the estimated update process time, the control unit 50 causes the update target ECU to execute an old program corresponding to a pre-update software. On the other hand, when the update process is completed within the estimated update process time, the control unit 50 causes the update target ECU to execute a new program corresponding to the updated software.

For example, when the update process execution unit 45 starts the update process, the control unit 50 starts a timer for measuring the update process time and starts measuring the elapsed time from the start of the update process. The control unit 50 waits for an update process completion notification to be input from the update process execution unit 45 while comparing the elapsed time and the estimated update process time. When the update process completion notification is input in an elapsed time shorter than the estimated update process time, the control unit 50 causes the microcomputer included in the update target ECU to execute the new program. On the other hand, when the elapsed time exceeds the estimated update process time, the control unit 50 causes the microcomputer included in the update target ECU to execute the old program.

The processing of the control unit 50 when the elapsed time exceeds the estimated update process time will be described in more detail. When the elapsed time exceeds the estimated update process time, the control unit 50 executes a different process depending on the memory configuration of the update target ECU. For the single bank memory configuration, the control unit 50 executes a rollback process on the update target ECU. Rollback refers to writing or writing back in order to restore the flash memory of the update target ECU to a predetermined state, such as restoring the program version to the previous one, when the update process is interrupted. In other words, rollback refers to returning the state of the update target ECU to the state before the start of the update process from the user's perspective. A rollback process known at the time of filing of the present application can be applied to the control unit 50. For example, if the distribution package includes a rollback program, the control unit 50 uses the rollback program to execute the rollback process on the update target ECU.

For the double bank memory configuration, the control unit 50 stores a new program in the flash memory of the update target ECU. For example, if the first memory is where an old program is to be stored and the second memory is where a new program is to be written, the control unit 50 stores the new program written in the second memory. As in the example of (B) of FIG. 3, if the installation is performed with the ignition switch 13 being turned on and writing of the new program to the second memory is completed, the control unit 50 stores the new program even if the update process is not completed within the estimated update process time.

The power supply process execution unit 51 outputs to the power supply system ECU 14D a control signal for setting to zero the output power of the drive battery, which is an IG power supply of the vehicle 1, to turn off the ignition of the vehicle 1.

Figure 5:
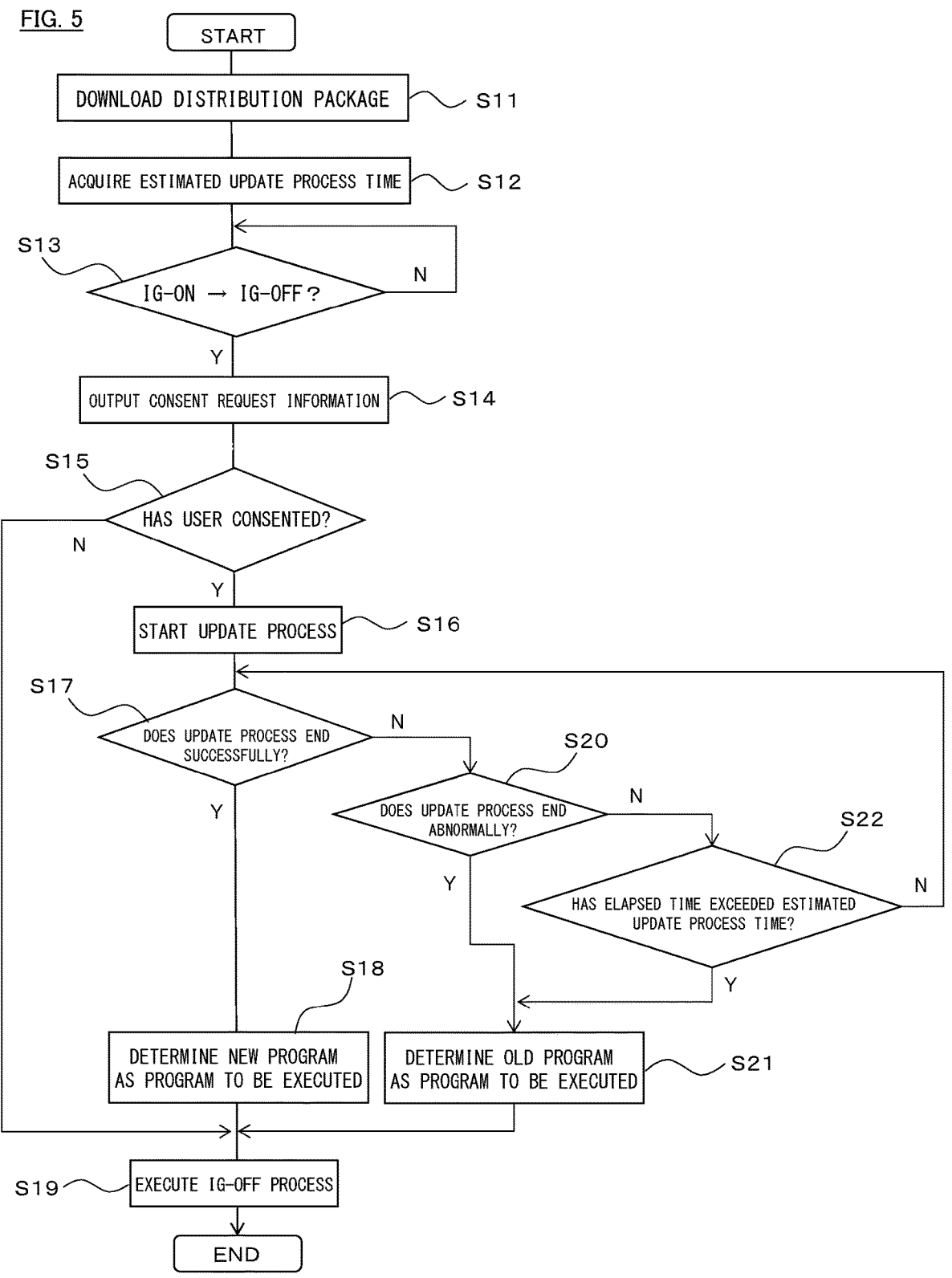
FIG. 5 is a flowchart of a software update method according to the first embodiment.

Next, an example of the software update method according to the present embodiment will be described with reference to a flowchart of FIG. 5. The flowchart illustrated in FIG. 5 is executed by the controller 40 of the software update device 10 illustrated in FIG. 4. Note that the flowchart of FIG. 5 is a flowchart for the single bank memory configuration for the update target ECU. Further, the flowchart of FIG. 5 is a flowchart from download (step S2) to confirmation of update completion (step S5) illustrated in FIG. 2.

In step S11, the controller 40 acquires (downloads) a distribution package from the server 2 through the in-vehicle communication device 11. The distribution package includes update data, authentication data used for an authentication process for the update data, and an estimated update process time. In step S12, the controller 40 acquires the estimated update process time from the distribution package acquired in step S11.

In step S13, the controller 40 determines whether or not the ignition switch 13 has been switched from on to off by an occupant's operation. The controller 40 acquires a signal indicating the occupant's operation from the ignition switch 13. When the ignition switch 13 is switched from on to off by the occupant, the processing proceeds to step S14, and when the ignition switch 13 remains on, the processing waits in step S13 until the ignition switch is switched from on to off by the occupant.

In step S14, the controller 40 outputs consent request information for asking the user for consent to start the update process for software. In the present embodiment, the controller 40 transmits consent request information to the server 2 through the in-vehicle communication device 11. After that, the consent request information is transmitted from the server 2 to the user terminal 3.

In step S15, the controller 40 determines whether or not the user has consented to the consent request information output in step S14. When the user performs an operation on the user terminal 3 indicating consent to start the update process, consent information is transmitted from the user terminal 3 to the server 2 as response information from the user in response to the consent request information. The controller 40 acquires the consent information from the server 2 and determines that the update process is to start. In this case, the processing proceeds to step S16. On the other hand, when the user performs an operation on the user terminal 3 indicating refusal to start the update process, refusal information is transmitted from the user terminal 3 to the server 2 as response information from the user in response to the consent request information. The controller 40 acquires the refusal information from the server 2 and determines that the update process is not to start. In this case, the processing proceeds to step S19.

If it is determined in step S15 that the user has consented, the processing proceeds to step S16. In step S16, the controller 40 starts software update process for the update target ECU. Specifically, for the single bank memory configuration for the ECU, the controller 40 executes the installation process and activation process as illustrated in the example of (A) of FIG. 3. The specific content of each process follows the above description. Further, in this step, the controller 40 starts a timer for measuring the update process time and starts measuring the elapsed time from the start of the update process.

In step S17, the controller 40 determines whether or not the update process started in step S16 has been successfully completed. When an update process completion notification is input to the controller 40 from the update target ECU, the controller 40 determines that the update process has been successfully completed. In this case, the processing proceeds to step S18. On the other hand, when an update process completion notification is not input from the update target ECU, the controller 40 determines that the update process has not been successfully completed. In this case, the processing proceeds to step S20.

If it is determined in step S17 that the update process has been successfully completed, the processing proceeds to step S18. In step S18, the controller 40 determines a new program as the target program to be executed by the update target ECU, and causes the update target ECU to execute the new program. In step S19, the controller 40 executes a process of turning off the ignition of the vehicle 1 as a process associated with an occupant's operation on the ignition switch in step S13. Specifically, the controller 40 outputs a control signal for turning off the ignition of vehicle 1 to the power supply system ECU 14D. When the process of step S19 ends, the processing in the flowchart illustrated in FIG. 5 ends.

If it is determined in step S17 that the update process has not been successfully completed, the processing proceeds to step S20. In step S20, the controller 40 determines whether or not the update process has ended abnormally. For example, when the controller 40 receives an abnormal end notification from the update target ECU, the controller 40 determines that the update process has ended abnormally. In this case, the processing proceeds to step S21. On the other hand, for example, when the controller 40 does not receive an abnormal end notification from the update target ECU, the controller 40 determines that the update process has not ended abnormally. In this case, the processing proceeds to step S22.

If it is determined in step S20 that the update process has ended abnormally, the processing proceeds to step S21. In step S21, the controller 40 determines an old program as the target program to be executed by the update target ECU, and causes the update target ECU to execute the old program. For example, the controller 40 performs the rollback process on the update target ECU. When the process of step S21 ends, the processing proceeds to step S19, and accordingly, the controller 40 executes the process of step S19 described above.

If it is determined in step S20 that the update process has not ended abnormally, the processing proceeds to step S22. In step S22, the controller 40 determines whether or not the elapsed time that started to be measured in step S16 exceeds the estimated update process time acquired in step S12. If the controller 40 determines that the elapsed time exceeds the estimated update process time, the processing proceeds to step S21, and accordingly, the controller 40 executes the process of step S21 described above. On the other hand, if the controller 40 determines that the elapsed time does not exceed the estimated update process time, the processing returns to step S17, and from then on, the processes of the steps described above are executed until the processing of FIG. 5 ends.

In a flowchart for the double bank memory configuration for the update target ECU, only the steps that are different from the processing for the single bank memory configuration will be described with reference to FIG. 5. For the double bank memory configuration, when the process of step S11 ends, the controller 40 executes the installation process using the new program acquired in step S11 before proceeding to step S12. Specifically, for the double bank memory configuration for the ECU, the controller 40 executes the installation process as illustrated in the example of (B) of FIG. 3. The specific content of the process follows the above description.

Further, in step S12, the controller 40 acquires an estimated time for the activation process as the estimated update process time. Accordingly, the target of comparison with the elapsed time in step S22 is the estimated process time for the activation process. In step S16, the controller 40 executes the activation process as a software update process for the update target ECU. For the double bank memory configuration for the ECU, the controller 40 executes the activation process as illustrated in the example of (B) of FIG. 3. The specific content of the process follows the above description. Further, in step S21, the controller 40 stores the new program written in the memory, and switches the load destination for the microcomputer of the ECU to the memory where the old program is stored.

As described above, the software update device 10 according to the present embodiment is a software update device that updates the software for the body system ECU 14A, the traveling system ECU 14B, and the multimedia system ECU 14C, which are mounted in the vehicle 1. The software update device 10 includes the output unit 43, the update process execution unit 45, and the control unit 50. The output unit 43 acquires update process information related to an update of software from the server 2. The update process execution unit 45 executes an update process according to response information that is a response to consent request information from the user. The control unit 50 determines a target program to be executed by the update target ECU based on an estimated update process time. Further, when the update process is not completed within the estimated update process time, the control unit 50 causes the update target ECU to execute an old program; when the software update is completed within the estimated update process time, the control unit 50 causes the update target ECU to execute a new program.

It is believed that examples of causes of an error that the software update process does not end include the surrounding environment of the update target ECU and the like. For example, when the ambient temperature of the update target ECU rises due to some reason, the update target ECU executes a self-diagnosis process based on a detection result from a temperature sensor, and the computational load on the microcomputer is increased. It is believed that when the computational load on the microcomputer is increased, the processing speed on the microcomputer is reduced, leading to an error that the update process does not end. However, in the software update device 10, the software update system 100, and the software update method according to the present embodiment, even when such a cause causes an error that the update process does not end, a target program to be executed by the update target ECU can be determined, so that the vehicle 1 becomes available, allowing the user to use the vehicle 1.

Further, in the present embodiment, the information acquisition unit 41 acquires the estimated update process time from the server 2. As a result, the target program to be executed by the update target ECU can be determined without the software update device 10 calculating the updated estimate process time, so that the computational load on the software update device 10 can be reduced.

Further, in the present embodiment, the update target ECU includes the flash memory that stores an old program, and the update process execution unit 45 includes the first installation execution unit 46 and the first activation execution unit 47. The first installation execution unit 46 executes an installation process for writing a new program to the flash memory after deleting the old program from the flash memory. The first activation execution unit 47 executes an activation process for causing the microcomputer to load the new program written in the flash memory. When the update process is not completed within the estimated update process time, the control unit 50 executes the rollback process on the update target ECU. As a result, even for the single bank memory configuration for the update target ECU, the target program to be executed by the update target ECU can be determined in response to an occurrence of an error that the update process does not end.

Further, in the present embodiment, the update target ECU includes the flash memory configured with the double bank composed of the first memory storing an old program and the second memory, and the update process execution unit 45 includes the second installation execution unit 48 and the second activation execution unit 49. The second installation execution unit 48 writes a new program into the second memory. The second activation execution unit 49 executes an activation process for changing the program load destination for the microcomputer from the first memory to the second memory. The control unit 50 stores the new program written in the second memory, as a process for the update process being not completed within the estimated update process time. Since the new program can be stored in the second memory of the update target ECU, there is no need to install the new program when the update process is performed again, and the computational load on the software update device 10 can be reduced.

Further, in the software update system 100 according to the present embodiment, the server 2 calculates the estimated update process time based on at least one of the size of the update data and the type of the update target ECU. As a result, the computational load on the software update device 10 can be reduced.

Note that a case has been described by way of example in which the software update device 10 acquires the estimated update process time from the server 2 in the present embodiment, but the subject that calculates the estimated update process time is not limited to the server 2, and the software update device 10 may calculate the estimated update process time.

As a modification example of the present embodiment, the controller 40 may include as a functional block a calculation unit that calculates the estimated update process time based on at least one of the data size of the update data and the type of the update target ECU. For example, if a map indicating a relationship between a data size of update data and an estimated update process time is stored in the storage unit 42 in advance, the calculation unit may refer to the map to calculate the estimated update process time corresponding to the data size. Further, for example, the calculation unit may calculate the estimated update process time such that it is longer as the data size of the update data is larger. Further, for example, the calculation unit may calculate the estimated update process time based on the specifications of the microcomputer and/or flash memory included in the ECU. Specific examples of the calculation method include the examples of the calculation method in the control device 23 described above. As in the modification example, the computational load on the server 2 can be reduced by the software update device 10 calculating the estimated update process time. Note that the timing at which the controller 40 calculates the estimated update process time is not particularly limited as long as it is before the start of the update process, and for example, in step S12 of the flowchart of FIG. 5, the controller 40 calculates the estimated update process time instead of acquiring the estimated update process time.

Second Embodiment

Next, a software update device according to a second embodiment will be described. In the first embodiment described above, the installation (step S3) and the activation (step S4) have been described by way of examples among the steps for an update of software by OTP illustrated in FIG. 2. In contrast, in the present embodiment, an example including the download (step S2) in addition to the installation and the activation will be described. For example, it is assumed that the user is asked to consent to start an update after campaign information is notified in step S1, and if the user consents to that, then the download to the activation are sequentially performed without requesting the user's consent. An example is a scene where software is updated by OTP in a situation where the vehicle is not being used by the user, such as when the vehicle is parked in a home parking lot.

A software update system according to the second embodiment is different from the software update system 100 according to the first embodiment in an estimated time calculated by the server 2 and the functional blocks included in the controller 60 of the software update device 10, and except for that, it has the same configuration as the software update system 100 according to the first embodiment. Thus, the same configuration as the first embodiment follows the above description.

In the present embodiment, the server 2 calculates the sum of an estimated download time required to complete the download of a distribution package and an estimated update process time of the first embodiment, as an estimated time until an update of software is completed (estimated update completion time). The server 2 distributes campaign information including the estimated update completion time to one or more vehicles 1.

The control device 23 of the server 2 calculates the estimated download time based on the data size of the distribution package. For example, if a map indicating a relationship between the data size of a distribution package and an estimated download time is stored in the database 22 in advance, the control device 23 refers to the map to calculate the estimated download time corresponding to the data size. Further, for example, the control device 23 calculates the estimated download time such that it is longer as the data size of the distribution package is larger.

Figure 6:
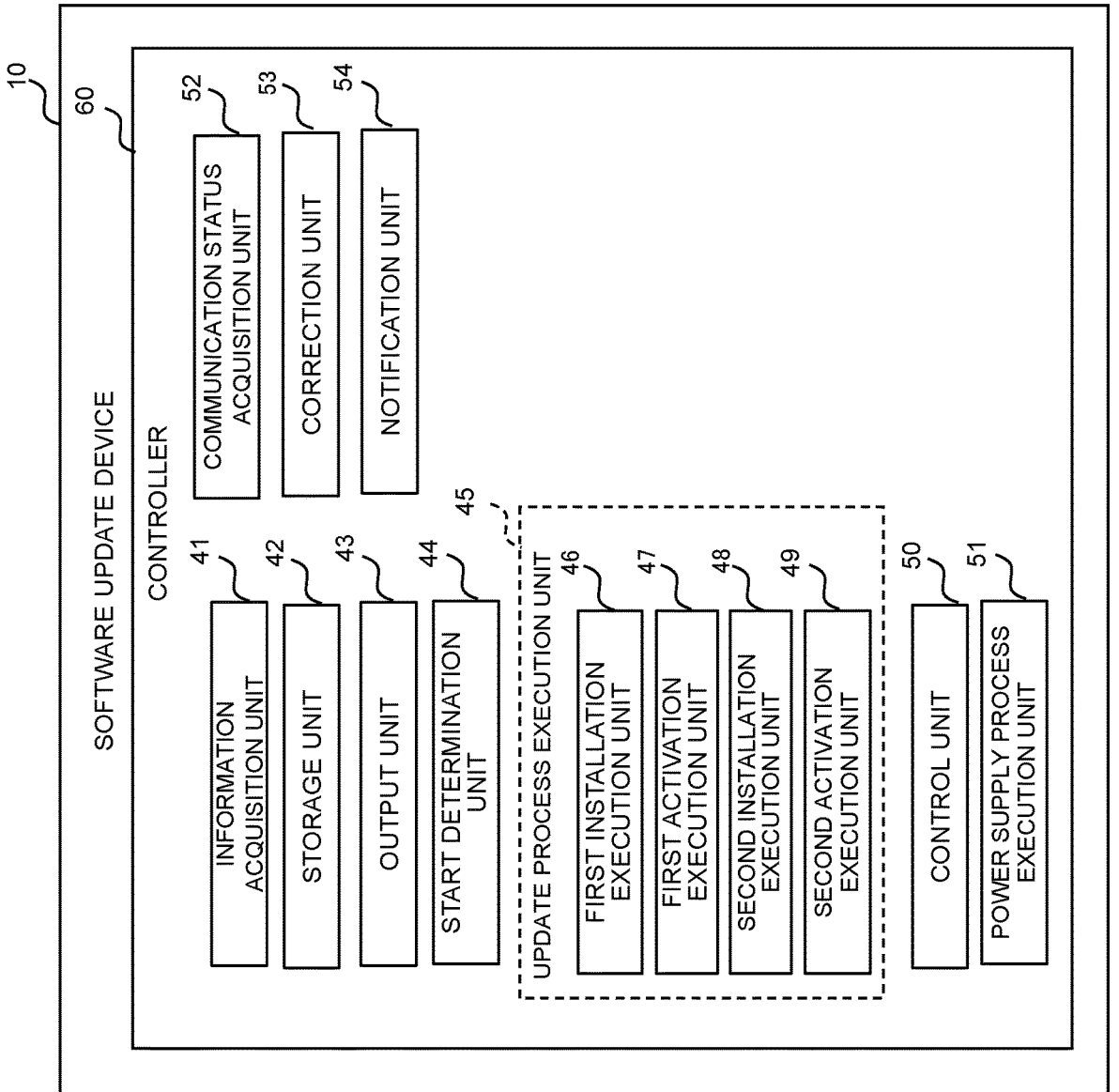
FIG. 6 is an example of functional blocks included in a controller of a software update device according to a second embodiment.

Next, the functional blocks of the controller 60 of the present embodiment will be described. FIG. 6 is an example of functional blocks included in a controller 60 of the software update device 10 according to the present embodiment. In the present embodiment, the controller 60 includes a communication status acquisition unit 52, a correction unit 53, and a notification unit 54 in addition to the functional blocks of the first embodiment. Further, in the present embodiment, the function of the output unit 43 is partially different from that of the first embodiment. The controller 60 implements each function of the functional blocks using software stored in the memory. Note that the same functional blocks as those in the first embodiment follow the description in the first embodiment.

In the present embodiment, the output unit 43 outputs consent request information for asking the user whether or not to consent to the update of software, including not only the update process by the update process execution unit 45 but also the download of a distribution package from the server 2. A specific example of the consent request information and a method for transmitting the consent request information to the user terminal 3 follows the description in the first embodiment. Further, in the present embodiment, the output unit 43 outputs the consent request information in a period from when the information acquisition unit 41 acquires campaign information and to when the information acquisition unit 41 acquires a distribution package.

The communication status acquisition unit 52 acquires communication status information related to a communication status with the server 2. The communication status acquisition unit 52 detects a state of communication between the in-vehicle communication device 11 and the communication device 21 of the server 2, and acquires the detected state of communication as communication status information. For example, for a state where communication is not established between the in-vehicle communication device 11 and the communication device 21, the communication status acquisition unit 52 detects that the state of communication is abnormal. Further, the communication status acquisition unit 52 may calculate a delay time in wireless data communication. The delay time includes a fixed delay time that is determined by the capability of the in-vehicle communication device 11 and a delay time that varies depending on the number of communication devices accessing the wireless communication network 4, the size of data to be communicated (communication fee), and the like. A technology for acquiring communication status known at the time of filing of the present application can be applied to the communication status acquisition unit 52.

The correction unit 53 acquires the estimated update completion time from the campaign information, and corrects the estimated update completion time based on the communication status information acquired by the communication status acquisition unit 52. Of the estimated update completion time, the estimated download time calculated by the server 2 does not take into account the actual communication status, so that there is a possibility that the estimated download time and the actual download time will differ. For example, an excellent state of communication between the in-vehicle communication device 11 and the communication device 21 results in a short delay time in wireless data communication, so that the actual download time may be shorter than the estimated download time. The correction unit 53 shortens the estimated download time according to the delay time in wireless data communication. Naturally, a poor state of communication between the in-vehicle communication device 11 and the communication device 21 results in a long delay time in wireless data communication, so that the actual download time may be longer than the estimated download time. In this case, the correction unit 53 extends the estimated download time according to the delay time in wireless data communication included in the communication status information.

The notification unit 54 outputs information on an estimated update time (hereinafter referred to as the estimated update time after correction) that is the sum of the estimated download time corrected by the correction unit 53 (hereinafter referred to as the estimated download time after correction) and the estimated update process time. In the present embodiment, the notification unit 54 transmits the information on the estimated update time after correction to the server 2 through the in-vehicle communication device 11. The information on the estimated update time after correction transmitted from the in-vehicle communication device 11 is received by the server 2, and then transmitted from the server 2 to the user terminal 3. By displaying the information on the estimated update time after correction on the user terminal 3, the user is notified of the estimated time after correction.

Further, the notification unit 54 may output the estimated update time after correction if the estimated update time after correction is longer by a predetermined threshold time than the estimated update time calculated by the server 2 (hereinafter referred to as the estimated update time before correction), which is an output condition for outputting the information on the estimated update time after correction. The predetermined threshold time is, for example, a predetermined time in minutes, such as 5 minutes. If the actual update time is expected to be significantly longer than the estimated time, this is likely to affect the user's decision as to whether or not to consent to the update. Therefore, the user is notified of the update time after correction before a distribution package is downloaded. On the other hand, if the estimated update time after correction is shorter than the estimated update time before correction, the notification unit 54 does not need to output the estimated time after correction. If the actual update time is expected to be shorter than the estimated time, this is less likely to affect the user's decision as to whether or not to consent to the update. Therefore, the user is not notified of the update time after correction before a distribution package is downloaded.

Figure 7:
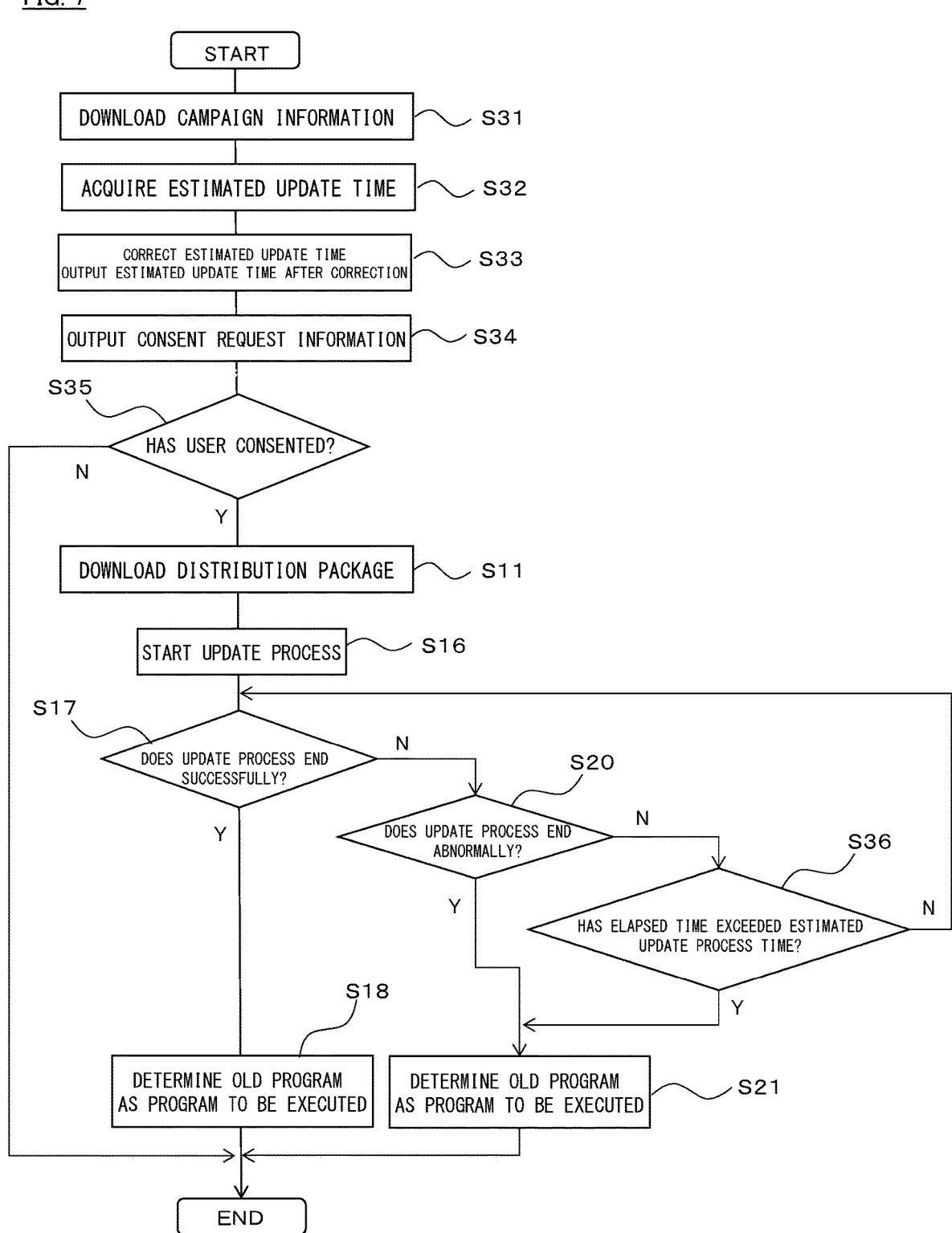
FIG. 7 is a flowchart of a software update method according to the second embodiment.

Next, an example of a software update method according to the present embodiment will be described with reference to the flowchart of FIG. 7. The flowchart illustrated in FIG. 7 is executed by the controller 60 of the software update device 10 illustrated in FIG. 6. Note that the flowchart of FIG. 7 is a flowchart for the single bank memory configuration for the update target ECU. Further, the flowchart in FIG. 7 is a flowchart from notification of campaign information (step S1) to confirmation of update completion (step S5) illustrated in FIG. 2. Further, the flowchart of FIG. 7 includes some of the same steps as the flowchart of FIG. 6. The same steps as those in FIG. 6 are given the same reference numerals as those in FIG. 6, and the same steps as those in FIG. 6 follow the above description. In the flowchart of FIG. 7, it is assumed that the ignition switch 13 is turned off, and step S19 illustrated in FIG. 6 is omitted. Note that in the flowchart of FIG. 7, the process of step S19 illustrated in FIG. 6 may be performed.

In step S31, the controller 60 acquires (downloads) campaign information from the server 2 through the in-vehicle communication device 11. The campaign information includes the data size of the update data, information for identifying the update target ECU, information on the version of the software to be updated, a general description of the function to be updated, an estimated download time, an estimated update process time, and the like. In step S32, the controller 60 acquires, from the campaign information acquired in step S31, an estimated update time that is the sum of the estimated download time and the estimated update process time.

In step S33, the controller 60 corrects the estimated download time of the estimated update time acquired in step S32, based on the communication status information related to the communication status with the server 2. The controller 60 outputs an estimated update time after correction that is the sum of the corrected estimated download time and the estimated update process time acquired in step S31. In the present embodiment, the controller 60 transmits the estimated update time after correction to the user terminal 3 through the in-vehicle communication device 11 and the server 2.

In step S34, the controller 60 outputs consent request information for asking the user for consent to an update of software. In the present embodiment, the controller 60 transmits the consent request information to the user terminal 3 through the in-vehicle communication device 11 and the server 2.

In step S35, the controller 60 determines whether or not the user has consented to the consent request information output in step S34. When the user performs an operation on the user terminal 3 indicating consent to the update of software, consent information is transmitted from the user terminal 3 to the server 2 as response information from the user in response to the consent request information. The controller 60 acquires the consent information from the server 2 and determines that the update of software is to start. Further, in the present embodiment, if it is determined that the user has consented, the controller 60 starts a timer for measuring the download time of a distribution package and the update process time and starts measuring the elapsed time from the download of the distribution package.

On the other hand, when the user performs an operation on the user terminal 3 indicating refusal to start the update process, refusal information is transmitted from the user terminal 3 to the server 2 as response information from the user in response to the consent request information. The controller 60 acquires the refusal information from the server 2, and the processing of the flowchart illustrated in FIG. 7 ends.

If it is determined in step S35 that the user has consented, the processing proceeds to step S11, and accordingly, the controller 60 starts download of the distribution package, as in the first embodiment. After the download of the distribution package is completed, the processing proceeds to step S16, and accordingly, the controller 60 starts the update process, as in the first embodiment.

Step S36 is a step corresponding to step S22 illustrated in FIG. 5. In step S36, the controller 60 compares the measurement time at the start of measurement when the user consented in step S35 and the estimated update time after correction corrected in step S33 to determine whether or not the elapsed time exceeds the estimated update time after correction. This differs from step S22 in the start timing of measurement of elapsed time and the comparison target of elapsed time, and except for that, it is the same as step S22, following the above description.

As described above, the software update device 10 according to the present embodiment includes the communication status acquisition unit 52, the correction unit 53, and the notification unit 54. The communication status acquisition unit 52 acquires communication status information related to a communication status with the server 2. The correction unit 53 corrects the estimated update time based on the communication status information. The notification unit 54 outputs information on the estimated update time after correction. As a result, it possible to improve the accuracy of the estimated download time. Further, since the user can be notified of the estimated update time including the estimated download time, the user can know the estimated time required for an update of software including download.

Further, in the present embodiment, when the estimated update time after correction is longer than the estimated update time before correction by a predetermined threshold time or more, the notification unit 54 outputs information on the estimated update time after correction. As a result, for example, even when the actual download time is longer than the estimated download time due to a poor state of communication between the in-vehicle communication device 11 and the communication device 21, the user can know the estimated time involving the actual communication status.

Further, in the present embodiment, when the estimated update time after correction is shorter than the estimated update time before correction, the notification unit 54 does not output information on the estimated update time after correction. As a result, for example, when the actual download time is shorter than the estimated down load time due to an excellent state of communication between the in-vehicle communication device 11 and the communication device 21, the process of notifying the user of the estimated time can be eliminated. Consequently, it is possible to reduce the time required for the entire software update flow by OTP.

Note that the embodiments described above are described to facilitate understanding of the present invention, and are not described to limit the present invention. Therefore, the elements disclosed in the above embodiments are meant to include all design changes and equivalents that fall within the technical scope of the present invention.

For example, although in the first embodiment described above, an example of flow has been described in which a distribution package is downloaded while the vehicle 1 is in a state of being able to travel, "the estimated update process time" in the first embodiment can be replaced with "the estimated update time that is the sum of the estimated download time and the estimated update process time" in the second embodiment. For example, although in the modification example of the first embodiment, a configuration has been described by way of example in which the controller 40 includes the calculation unit that calculates the estimated update process time, the controller 60 according to the second embodiment may include a calculation unit that calculates the estimated download time of the estimated update time. When the vehicle 1 travels along a travel route, the information acquisition unit 41 acquires information about the travel route of the vehicle 1 from a navigation system (not illustrated) of the vehicle 1. The calculation unit calculates the estimated download time based on the communication status information acquired by the communication status acquisition unit 52 and the travel route of the vehicle 1 acquired by the information acquisition unit 41. For example, the calculation unit acquires communication status information of the wireless communication network 4 at a plurality of points on the travel route from a communication map that indicates the communication status of the wireless communication network 4 provided by a communication carrier. The calculation unit calculates the estimated download time when the vehicle 1 travels along the travel route based on the communication status information on the travel route of the vehicle 1. The accuracy of the estimated download time when a distribution package is downloaded while the vehicle 1 is in a state of being able to travel can be improved.

Further, for example, although in the second embodiment described above, the configuration for correcting the estimated update time has been described as an example, the present invention is not limited to the configuration for correcting the estimated update time. The controller 60 may use the estimated update time before correction to determine a target program to be executed by the update target ECU.

For example, although in the second embodiment described above, a flow has been described by way of example in which there is no request for user's consent in a period from the download (step S2) to the confirmation of update completion (step S5) illustrated in FIG. 2, the controller 60 may, before the process of each step starts, output consent request information for asking the user whether or not to consent to start the process. Further, as a process for the double bank memory configuration and when the elapsed time exceeds the estimated update time (including the estimated update time after correction), the controller 60 may execute a rollback process on the update target ECU. For example, in the flowchart of FIG. 7, it is now assumed that the actual download time is longer than the estimated download time, and when the installation process being executed, it is determined that the elapsed time exceeds the estimated update time after correction (Yes in step S36). In this case, since writing of a new program to the second memory has not been completed, the controller 60 executes a rollback process on the update target ECU. Even for the double bank memory configuration for the update target ECU and when writing of a new program has not been completed, a target program to be executed by the update target ECU can be determined, so that the vehicle 1 becomes available, allowing the user to use the vehicle 1.

Further, for example, the controller 60 may include a measurement unit that measures the actual required time required from the start to the completion of the update process. When the measurement by the measurement unit is completed, the output unit 43 transmits information on the actual required time required for the update process to the server 2 through the in-vehicle communication device 11. This can be reflected in the estimated update process time for other vehicles 1 for which software has not been updated, and the accuracy of the estimated update process time can be improved.

DESCRIPTION OF REFERENCE NUMERALS

100 Software update system
1 Vehicle
10 Software update device
40 Controller
41 Information acquisition unit
42 Storage unit
43 Output unit
44 Start determination unit
45 Update process execution unit
46 First installation execution unit
47 First activation execution unit
48 Second installation execution unit
49 Second activation execution unit
50 Control unit
51 Power supply process execution unit
11 In-vehicle communication device
12 In-vehicle terminal
13 Ignition switch
14A Body system ECU
14B Traveling system ECU
14C Multimedia system ECU
14D Power supply system ECU
2 Server
21 Communication device
22 Database
23 Control device
3 User terminal
31 Terminal communication device
32 Terminal HMI
33 Terminal control device

The invention claimed is:

1. A software update device configured to update software for an in-vehicle control device mounted in a vehicle, the software update device comprising:

an information acquisition unit configured to acquire, from a server provided outside the vehicle, update process information related to an update of the software;

an output unit configured to output consent request information for asking a user whether to consent to the update of the software;

an execution unit configured to execute an update process for the software according to response information that is a response to the consent request information from the user;

a calculation unit configured to calculate an estimated time required for the update; and a communication status acquisition unit configured to acquire communication status information related to a communication status with the server, wherein the communication status information includes strengths of the connection to the server and comprises connection statuses of different degrees;

a correction unit configured to correct the estimated time based on the communication status information; and a notification unit configured to output information on the corrected estimated time, wherein the notification unit is configured to, when the corrected estimated time is shorter than the estimated time before correction, not output information on the corrected estimated time.

2. The software update device according to claim 1, wherein the information acquisition unit is configured to acquire the estimated time from the server.

3. The software update device according to claim 1, comprising a calculation unit configured to calculate the estimated time based on a size of data used to update the software.

4. The software update device according to claim 1, further comprising:

a control unit configured to determine a target program to be executed by the in-vehicle control device, based on the estimated time, wherein the in-vehicle control device includes a first memory that stores a first program for implementing an old version of the software, the execution unit includes:

an installation execution unit configured to execute an installation process for writing a second program for implementing a new version of the software to the first memory after deleting the first program from the first memory; and an activation execution unit configured to execute an activation process for loading the second program written in the first memory, and the control unit is configured to, when the update process is not completed within the estimated time, execute a rollback process for the in-vehicle control device.

5. The software update device according to claim 1, further comprising:

a control unit configured to determine a target program to be executed by the in-vehicle control device, based on the estimated time, wherein the in-vehicle control device includes a first memory that stores a first program for implementing an old version of the software, and a second memory, the execution unit includes:

an installation execution unit configured to write a second program for implementing a new version of the software to the second memory; and an activation execution unit configured to execute an activation process for changing a program load destination from the first memory to the second memory, and

the control unit is configured to store the second program written in the second memory, as a process for the update process being not completed within the estimated time.

6. The software update device according to claim 5, wherein the control unit is configured to execute a rollback process for the in-vehicle control device, as a process for the update being not completed within the estimated time.

7. The software update device according to claim 1, comprising a measurement unit configured to measure an actual required time required from start to completion of the update process, wherein the output unit is configured to output information on the actual required time to the server.

8. The software update device according to claim 1, wherein the estimated time required for update is included in a distribution package.

9. The software update device according to claim 1, wherein the calculation unit is provided in the vehicle.

10. A software update system comprising:

a software update device configured to update software for an in-vehicle control device mounted in a vehicle, the software update device comprising:

an information acquisition unit configured to acquire, from a server provided outside the vehicle, update process information related to an update of the software;

an output unit configured to output consent request information for asking a user whether to consent to the update of the software;

an execution unit configured to execute an update process for the software according to response information that is a response to the consent request information from the user;

a communication status acquisition unit configured to acquire communication status information related to a communication status with the server, wherein the communication status information includes strengths of the connection to the server and comprises connection statuses of different degrees;

a correction unit configured to correct, based on the communication status information, an estimated download time required to complete download of the update process information from the server, of the estimated time required for the update;

a notification unit configured to output information on the estimated time after the correction; and a control unit configured to determine a target program to be executed by the in-vehicle control device, based on the estimated time before correction or after correction, wherein the control unit is configured to:

cause, when the update is not completed within the estimated time before the correction or after the correction, the in-vehicle control device to execute a program corresponding to a pre-update software; and cause, when the update is completed within the estimated time before the correction or after the correction, the in-vehicle control device to execute a program corresponding to an updated software; and the server.

11. The software update system according to claim 10, wherein the server is configured to calculate the estimated time based on at least one of a size of data used to update the software and a type of the in-vehicle control device.

12. A software update method for updating, by a controller, software for an in-vehicle control device mounted in a vehicle, the software update method comprising:

acquiring, from a server provided outside the vehicle, update process information related to an update of the software;

outputting consent request information for asking a user whether to consent to the update of the software;

executing an update process for the software according to response information that is a response to the consent request information from the user;

calculating an estimated time required for the update; and acquiring communication status information related to a communication status with the server, wherein the communication status information includes strengths of the connection to the server and comprises connection statuses of different degrees:

correcting the estimated time based on the communication status information; and outputting information on the corrected estimated time, wherein a step of outputting the information on the corrected estimated time includes a step of not output information on the corrected estimated time when the corrected estimated time is shorter than the estimated time before correction.

13. A software update device configured to update software for an in-vehicle control device mounted in a vehicle, the software update device comprising:

an information acquisition unit configured to acquire, from a server provided outside the vehicle, update process information related to an update of the software;

an output unit configured to output consent request information for asking a user whether to consent to the update of the software;

an execution unit configured to execute an update process for the software according to response information that is a response to the consent request information from the user;

a communication status acquisition unit configured to acquire communication status information related to a communication status with the server, wherein the communication status information includes strengths of the connection to the server and comprises connection statuses of different degrees:

a correction unit configured to correct, based on the communication status information, an estimated download time required to complete download of the update process information from the server, of the estimated time required for the update;

a notification unit configured to output information on the estimated time required for the update after the correction; and a control unit configured to determine a target program to be executed by the in-vehicle control device, based on the estimated time required for the update before correction or after correction, wherein the notification unit is configured to, when the estimated time after the correction is longer than the estimated time required for the update before correction by a predetermined threshold time or more, output information on the estimated time required for the update after the correction, and the control unit is configured to cause, when the update is not completed within the estimated time required for the update before the correction or after the correction, the in-vehicle control device to execute a program corresponding to a pre-update software, and cause, when the update is completed within the esti-
mated time required for the update before the cor-
rection or after the correction, the in-vehicle control
device to execute a program corresponding to an
updated software.

14. The software update device according to claim 1,
further comprising:

a control unit configured to determine a target program to
be executed by the in-vehicle control device, based on
the estimated time required for the update, wherein the
control unit is configured to:

cause, when the update is not completed within the
estimated time required for the update, the in-vehicle
control device to execute a program corresponding to a
pre-update software; and cause, when the update is completed within the estimated
time required for the update, the in-vehicle control
device to execute a program corresponding to an
updated software.

\* \* \* \* \*